US009204458B2

(12) United States Patent
Heo et al.

(10) Patent No.: US 9,204,458 B2
(45) Date of Patent: Dec. 1, 2015

(54) METHOD AND APPARATUS FOR PROVIDING FAIRNESS-ASSURED QUALITY OF SERVICE IN CONTENTION-BASED WIRELESS NETWORK

(71) Applicant: Electronics and Telecommunications Research Institute, Daejeon-si (KR)

(72) Inventors: Hwan-Jo Heo, Daejeon-si (KR);
Jong-Dae Park, Daejeon-si (KR);
Tae-Soo Chung, Daejeon-si (KR);
Byung-Ho Yae, Daejeon-si (KR);
Sung-Jin Moon, Daejeon-si (KR);
Woo-Sug Jung, Daejeon-si (KR);
Sung-Kee Noh, Daejeon-si (KR);
Nam-Seok Ko, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 355 days.

(21) Appl. No.: 13/681,478

(22) Filed: Nov. 20, 2012

(65) Prior Publication Data

US 2013/0215839 A1    Aug. 22, 2013

(30) Foreign Application Priority Data

Feb. 20, 2012  (KR) .......................... 10-2012-0017038

(51) Int. Cl.
*H04W 72/10*    (2009.01)

(52) U.S. Cl.
CPC ...................................... *H04W 72/10* (2013.01)

(58) Field of Classification Search
None
See application file for complete search history.

(56) References Cited

U.S. PATENT DOCUMENTS

2009/0196306 A1*  8/2009  King et al. .................... 370/462
2010/0135264 A1   6/2010  Nilsson \* cited by examiner

*Primary Examiner* — Huy D Vu
*Assistant Examiner* — Teisha D Hall
(74) *Attorney, Agent, or Firm* — Nelson Mullins Riley & Scarborough LLP; Anthony A. Laurentano, Esq.; Lewis Lee, Esq.

(57) ABSTRACT

A method of assuring QoS in consideration of fairness in a contention-based wireless network and a terminal for the same are provided. When a token is allocated by a wireless access point, the terminal determines priority of a data frame which the terminal intends to use in communication, through a scheme of splitting the allocated token. Therefore, fairness can be assured by selection of the terminal.

14 Claims, 5 Drawing Sheets

METHOD AND APPARATUS FOR PROVIDING FAIRNESS-ASSURED QUALITY OF SERVICE IN CONTENTION-BASED WIRELESS NETWORK

CROSS-REFERENCE TO RELATED APPLICATION

This application claims the benefit under 35 USC 119(a) of Korean Patent Application No. 10-2012-0017038, filed on Feb. 20, 2012, the entire disclosure of which is incorporated herein by reference for all purposes.

BACKGROUND

1. Field

The following description relates to a wireless access network, and more particularly, to technology for assuring quality of service (QoS) in consideration of fairness between users in a wireless access network.

2. Description of the Related Art

In a contention-based wireless access network, a plurality of terminals contend for access to a channel. IEEE 802.11 WLAN fundamentally uses the distributed coordination function (DCF) and the hybrid coordination function (HCF) in 802.11e.

IEEE 802.11 mandates wireless stations to check if the medium is idle for a given period of time—sum of the inter-frame space (IFS) and the contention window (CW)—by waiting with sensing the medium before transmitting packets. The HCF of IEEE 802.11e further provides the enhanced distributed channel access (EDCA) that specifies a set of arbitration inter-frame spaces (AIFS) and contention window boundaries to differentiate the channel access probability according to the priority of traffic streams. Basically, the smaller value of AIFS and CW for higher-priority traffic gives the higher chance of packets being sent.

Although such a channel access method provides a way of traffic prioritization in wireless access networks, the fair use of the medium among wireless terminals is not properly considered in the literature; for example, a greedy terminal may send high-priority traffic packets incessantly causing monopoly on the channel while other terminals in contention thus experience starvation.

U.S. Patent Publication No. 2010/0135264 discloses technology in which each of a plurality of terminals adjusts the use of an access channel according to a rate control algorithm.

SUMMARY

The following description relates to a QoS provisioning method while assuring fairness among terminals in a contention-based wireless network, and a terminal for the same.

In one general aspect, a terminal that contends with other terminals to communicate with a wireless access point includes: a processor configured to determine priority of a data frame that the terminal intends to use in communication by splitting an allocated token when the token is allocated to the terminal by the wireless access point.

In another general aspect, a contention-based wireless network system includes: a wireless access point configured to allocate a token to a terminal; and a terminal configured to split the allocated token according to a kind of an application and a network state, on the basis of balance between a transmission probability by contention of terminals and the number of transmissions when the token is allocated by the wireless access point, and determine priority of a data frame which the terminal intends to use in communication.

In another general aspect, a method of assuring quality of service in consideration of fairness for a terminal contending with other terminals to communicate with a wireless access point includes: allocating, by the wireless access point, a token to the terminal; splitting the allocated token to determine priority of a data frame which the terminal intends to use in communication; and communicating with the wireless access point by using the split token on a channel according to the determined priority.

Other features and aspects will be apparent from the following detailed description, the drawings, and the claims.

Figure 1:
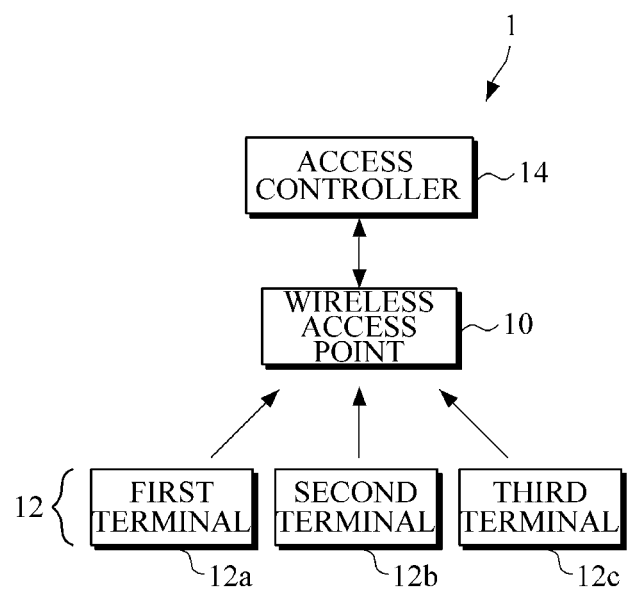
FIG. 1 is a diagram illustrating a contention-based wireless access network according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings. In the following description, when the detailed description of the relevant known function or configuration is determined to unnecessarily obscure the important point of the present invention, the detailed description will be omitted. Moreover, the terms that have been defined as described above may be altered according to the intent of a user or operator, or conventional practice. Therefore, the terms should be defined on the basis of the entire content of this specification.

FIG. 1 is a diagram illustrating a contention-based wireless access network 1 according to an embodiment of the present invention.

Referring to FIG. 1, the contention-based wireless access network 1 includes a wireless access point 10, a terminal 12, and an access controller 14. A plurality of terminals may be provided.

The network 1 is a wireless system in which a plurality of terminals 12a to 12c contend for communicating with one wireless access point 10. The present invention provides fairness between terminals in the contention-based wireless access network 1. For example, it is required to allow a preferential channel access to a terminal (or a service that the terminal uses) that performs real-time communication prior to a terminal that performs non-real-time communication, for assuring high quality of real-time communication. However, in the present invention, channel access authority is adjusted in consideration of both efficiency and fairness between terminals such that a terminal (which performs non-real-time communication) obtains the opportunity to access a channel by preventing excessive channel access allowance to a terminal that performs real-time communication, thus maintaining fairness between the terminals.

The network 1 may support one or more access channels sharable by all the terminals 12. The access channel, for example, is a channel that is used by the terminal 12 for transmitting system accesses, call transmissions, responses to pages, responses to messages transmitted by a system, and messages for registrations and the like. The access channel may be used by the terminal 12 for transmitting a small amount of data on a reverse link.

The wireless access point 10 allocates a token to the terminal 12 at certain intervals or according to the request of the terminal 12. "Token" is a common term in communication and refers to a right to use communication resources.

The role and function of the wireless access point 10 may be actually realized in the wireless access point 10 itself, or may be realized in wired equipment 14 (for example, the access controller 14 of FIG. 1) that manages and adjusts the wireless access point 10. Examples related to this include a case (autonomous mode) in which a WLAN access point (AP) operates autonomously and a case (dependent mode) in which the WLAN AP is dependently operated by a WLAN controller, in IEEE 802.11 WLAN. Therefore, even when the wireless access point 10 has been clarified as performing a specific function, the specific function may actually be performed by the wired equipment 14, or may be distributed to and performed by the wireless access point 10 and the wired equipment 14.

When the wireless access point 12 allocates a token to the terminal 12, the terminal 12 splits the token to determine the priority of a data frame that the terminal 12 intends to use for communication. The terminals 12 may be overall located over the network 1, and each of the terminals 12a to 12c may be a fixed terminal or a mobile terminal. The terminal 12 may be referred to as an access terminal (AT), a mobile station (MS), user equipment (UE), a subscriber unit, or a station. The terminal 12 may be a cellular phone, a personal digital assistant (PDA), a wireless modem, a wireless communication device, a portable device, a laptop computer, a cordless phone, or a wireless local loop (WLL) station. Especially, the terminal 12 may be a multifunctional portable device including a smart phone and a smart pad.

The terminal 12 communicates with the wireless access point 10 through a forward link and a reverse link. The forward link (downlink) indicates a communication link from the wireless access point 10 to the terminal 12, and the reverse link (uplink) indicates a communication link from the terminal 12 to the wireless access point 10.

The terminal 12 accesses the wireless access point 10 and establishes wireless access to the wireless access point 10 for wirelessly transmitting and receiving data. Wireless resources for wireless access may be allocated to the terminal 12. For example, a forward traffic channel through which the terminal 12 is capable of receiving data and a reverse traffic channel through which the terminal 12 is capable of transmitting data may be allocated. The terminal 12 may transmit and receive a data frame for applications through wireless access. The applications, for example, may include voice-over-Internet protocol (VoIP), web browsing, email, etc., but are not limited thereto.

Figure 2:
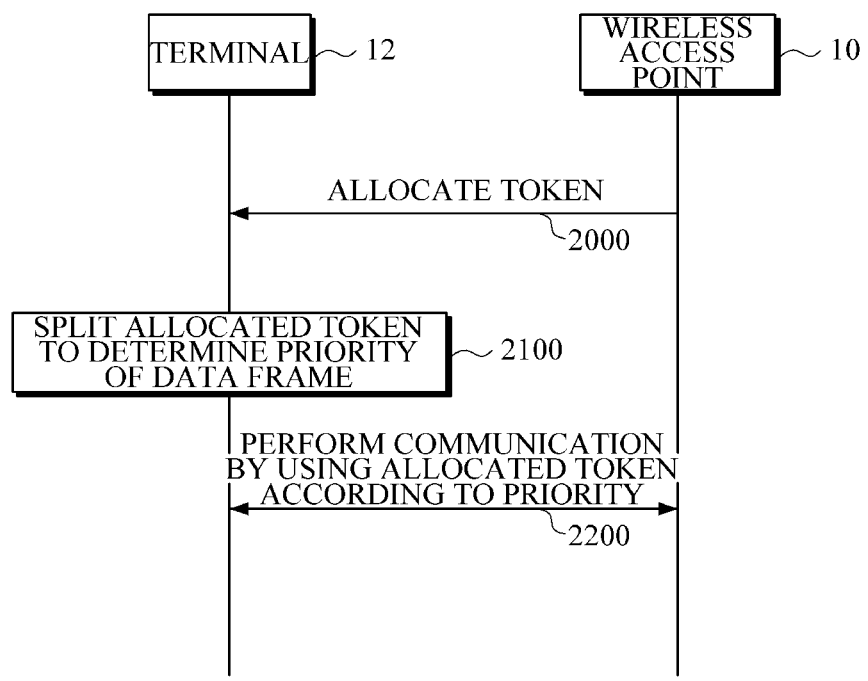
FIG. 2 is a flowchart illustrating a method of providing fairness-assured QoS in the contention-based wireless access network according to an embodiment of the present invention.

FIG. 2 is a flowchart illustrating a method of providing fairness-assured QoS in the contention-based wireless access network according to an embodiment of the present invention.

Referring to FIG. 2, the wireless access point 10 allocates a token to each of the terminals 12 at certain intervals or according to a request of the terminals 12, in operation 2000. The token is a right for the terminal 12 to communicate. The token has a whole number value, called the length of the token, as an attribute. The length of the token may be identically allocated to all the terminals 12a to 12c, or may be differentially allocated to the terminals 12a to 12c according to services to which users have respectively subscribed or priorities given to the terminals 12a to 12c. In addition, the length of the token may be a value that depends on the current condition of a network or user and varies with time.

According to an embodiment, the token is allocated to each of the terminals 12 at certain intervals. For example, as in the beacon frame of WLAN, the length of the token may be added into a packet that is transferred to the terminal 12 at certain intervals and thereby transferred to the terminal 12. According to another embodiment, the terminal 12 may receive the token from the wireless access point 10 when the terminal 12 updates the token autonomously and continuously according to a function (a function that defines the length of the token regenerated per unit time) that gradually updates and changes the length of the token.

When the terminal 12 splits an allocated token into large pieces per unit time, the number of available tokens is reduced in inverse proportion to the split pieces. On the other hand, when the terminal 12 splits the token into small pieces, a transmission probability becomes lower because a channel contention standby time is extended, but a data frame is capable of being transmitted because there are many tokens. Accordingly, the terminal 12 may perform autonomous selection according to the kind of a used application and a network state, in consideration of tradeoff between a transmission probability by contention and the number of transmissions. The tradeoff gives characteristics such as fairness to a method that supports differentiation according to the kind of traffic in the contention-based wireless access network, by using a dependent variable such as the number of transmissions.

In such a tradeoff, the terminal 12 splits a token to determine the priority of a frame that the terminal 12 intends to transmit, through the following schemes, in operation 2100.

First, the user of the terminal 12 may manually determine priority. The user may determine the level of priority which is necessary for an application the user uses, in consideration of experience and learning of the user or a current network state actually experienced by the user. The user may input the determined priority through an application or an operating system (OS).

Second, an application may determine priority. The application may flexibly select priority based on a current network state and the quality of service that is provided to a user. For example, the VoIP application may provide a service to a user by using specific priority, but when QoS that the application perceives is not sufficient (for example, jitter or frame loss occurs), the application may enhance priority, thus increasing quality.

Third, the OS may determine priority. The OS has a flexible priority determination system according to an application, and thus, even though the application does not autonomously adjust priority, the OS may determine priority.

Subsequently, the terminal 12 communicates with the wireless access point 10 by using the split token on a channel according to the determined priority, in operation 2200.

Figure 3:
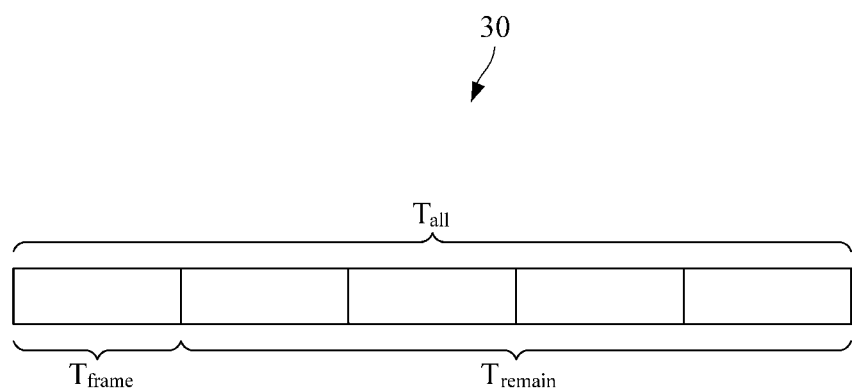
FIG. 3 is a reference diagram illustrating an example of a token according to an embodiment of the present invention.

FIG. 3 is a reference diagram illustrating an example of a token according to an embodiment of the present invention.

As illustrated in FIG. 3, a terminal splits a token 30 (which the terminal has) into pieces each having a specific length, and uses the split token 30 in transmitting a data frame.

$$T_{all} = T_{frame} + T_{remain} \quad (1)$$

Referring to Equation (1), when $T_{all}$ is the length of a current token, the length "$T_{all}$" of the current token is the sum of the length "$T_{frame}$" of a token (which is allocated to a data frame to be currently transmitted) and the length "$T_{remain}$" of a token that is allocated to a data frame to be transmitted later. The terminal splits the token 30 into the token length "$T_{frame}$" and the token length "$T_{remain}$". The terminal uses the token length "$T_{frame}$" in transmitting the data frame to be currently transmitted, and uses the token length "$T_{remain}$" in transmitting the data frame to be transmitted later.

When the terminal transmits a frame using the token 30 having the token length "$T_{frame}$", a time for which the terminal stands by for channel contention is determined by the token length "$T_{frame}$". An average channel contention standby time is inversely proportional to the token length "$T_{frame}$". This is expressed as Equations (2).

$$AIFS = K_{AIFS} \times \frac{1}{T_{frame}} + C_{AIFS} \quad (2)$$

$$CW_{min} = K_{CW_{min}} \times \frac{1}{T_{frame}} + C_{CW_{min}}$$

$$CW_{max} = K_{CW_{max}} \times \frac{1}{T_{frame}} + C_{CW_{max}}$$

Referring to Equations (2), in a wireless access network such as IEEE 802.11e WLAN, a standby time for channel contention is determined as the sum of an arbitration interframe space (AIFS) and a contention window (CW). In the CW, "$CW_{min}$" denotes a minimum boundary value, and "$CW_{max}$" denotes a maximum boundary value. Variables "AIFS", "$CW_{min}$", and "$CW_{max}$" are set as values that are inversely proportional to the token length "$T_{frame}$". That is, each of the variables may be defined as a primary function of the reciprocal of the token length "$T_{frame}$". Variables "$K_{AIFS}$", "$C_{AIFS}$", "$K_{CWmin}$", "$C_{CWmin}$", "$K_{CWmax}$", and "$C_{CWmax}$" denote factors such as the kind, condition, rule, and optimization of a wireless access network. When the terminal splits a token into large pieces, the token length "$T_{frame}$" increases, and a contention standby time is shortened. Accordingly, the terminal succeeds in contention, and thus, the frame transmission probability becomes higher. However, the number of transmissions is reduced.

Figure 4:
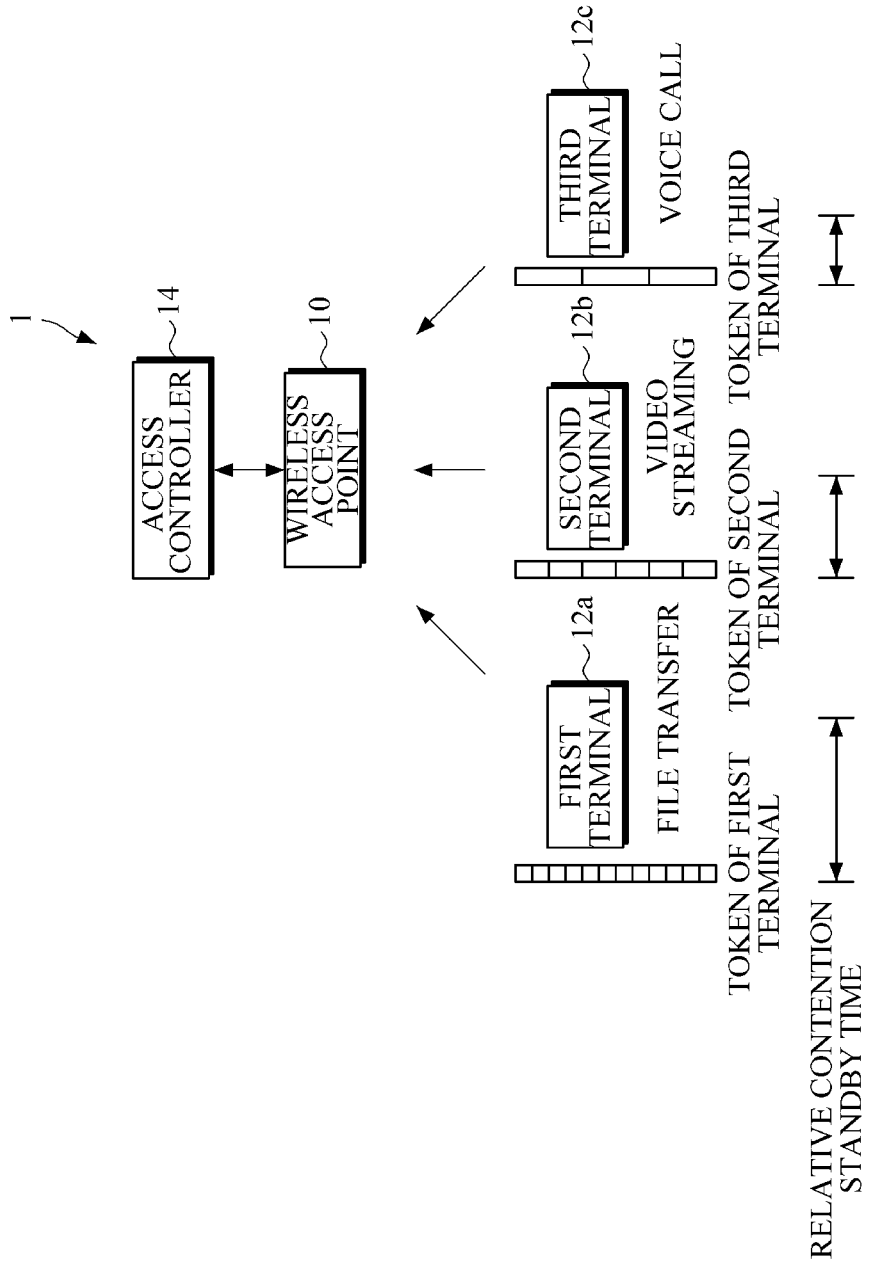
FIG. 4 is a reference diagram illustrating an embodiment of token split in consideration of fairness in the contention-based wireless access network according to an embodiment of the present invention.

FIG. 4 is a reference diagram illustrating an embodiment of token split in consideration of fairness in the contention-based wireless access network according to an embodiment of the present invention.

FIG. 4 illustrates three terminals 12a to 12c contending to communicate with the wireless access point 10. It is assumed that a first terminal 12a accesses a channel for file transmission, a second terminal 12b accesses the channel for video streaming, and a third terminal 12c accesses the channel for voice call. Among these three applications, the voice call has the strongest real-time characteristic, followed by the video streaming, and finally the file transmission, so these applications have traffic priorities in the same order.

In FIG. 4, tokens having the same length are respectively allocated to the three terminals 12a to 12c. In this case, the third terminal 12c requires high priority, and thus splits the allocated token into large pieces and uses the split token. Therefore, when it has to transmit a frame, the probability of being able to use a channel is high, but the number of transmissions allotted is small, resulting in an actual amount of transmission not being large. On the other hand, the first terminal 12a has low priority, and thus when it has to transmit a frame, the probability of being able to use a channel is low, but a large number of frames can be transmitted.

The length of a token that a terminal splits and uses for frame transmission varies. For example, when the terminal simultaneously drives various applications, the length of the token may vary according to the kind of an application. Also, when the performance of an application is not sufficiently obtained by channel contention, the terminal splits the token into larger pieces, and thus favorably adjusts channel contention.

The present invention requires the following additional conditions for effective use in the contention-based wireless access network 1.

First, the opportunity to use a channel that is probabilistically determined according to a contention standby time is a relative value between terminals, and thus, a normalization rule is required. When a contention standby time is long, efficiency of channel use is degraded, and when the contention standby time is very short, the channel cannot be suitable for a wireless access network. For example, in IEEE 802.11 WLAN, traffic having the highest priority requires that the value of the variable "AIFS" is not shorter than the variable "SIFS". Therefore, in IEEE 802.11 WLAN, a rule governing channel contention standby time according to a kind of traffic such as Wi-Fi multimedia (WMM) is necessary.

However, a terminal may have autonomy within an appropriate range. For example, in voice call, when there are many terminals that have similar priority in the wireless access network, the opportunity to use a channel is relatively reduced, and thus, the quality of voice call can be degraded. In this case, the terminal splits a token into larger pieces and thus increases the opportunity to use the channel, but, since the length of a left token becomes relatively shorter, appropriate adjustment is required in splitting and using the token.

Second, a terminal needs to transmit a frame even without a token. That is, even when the terminal does not have an available token or a contention standby time cannot be converted into a meaningful channel contention standby time because of being very short, the terminal needs to fundamentally transmit a frame at low priority even without a token.

In such transmission, the channel contention standby time is longer than a channel contention standby time obtained as the length of a token that may be minimally split and used by a terminal, and thus the terminal transmits a frame at low priority compared to terminals that perform transmission using a corresponding token. However, when many frames are transmitted due to a long contention standby time, the efficiency of a channel is degraded, and thus a wireless access point needs to appropriately adjust the length of a token allocated to the terminal in units of a certain time, depending on network conditions.

Figure 5:
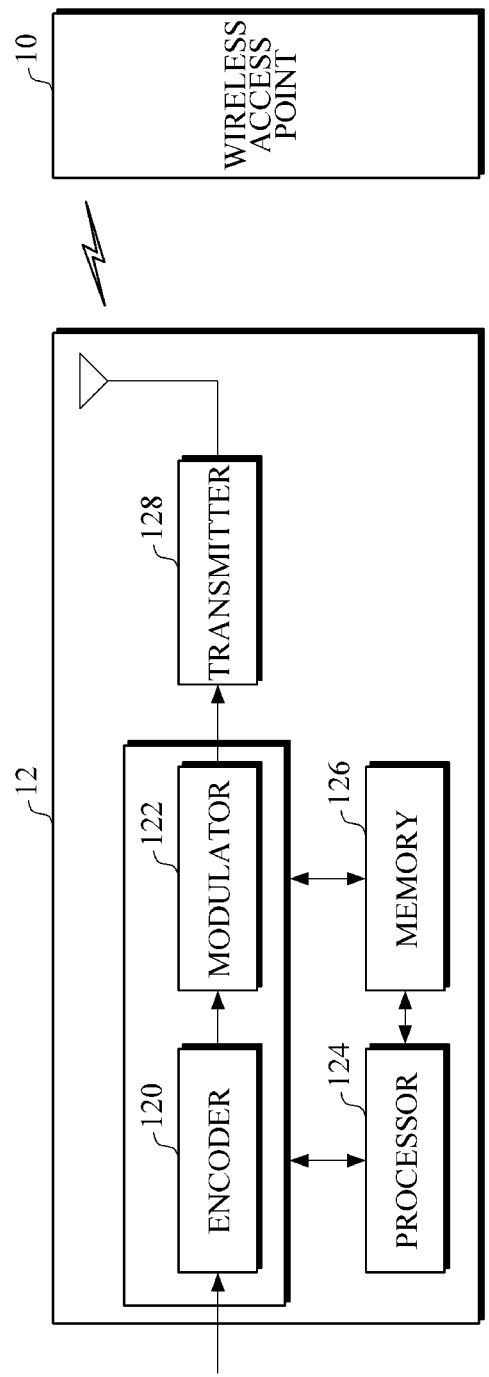
FIG. 5 is a block diagram illustrating a terminal and a wireless access point according to an embodiment of the present invention.

FIG. 5 is a block diagram illustrating a terminal 12 and a wireless access point 10 according to an embodiment of the present invention.

Referring to FIG. 5, the terminal 12 includes an encoder 120, a modulator 122, a processor 124, a memory 126, and a transmitter 128.

In the terminal 12, the encoder 120 receives data and messages (for example, access probes) to be transmitted by the terminal 12 on a reverse link. Then, the encoder 120 processes (for example, encodes and interleaves) the data and the messages. The modulator 122 additionally processes (for example, modulates, channelizes, and scrambles) the encoded data and messages to provide a plurality of output samples. The transmitter 128 conditions (for example, analog-converts, filters, amplifies, and frequency-up-converts) the output samples to generate a reverse link signal, and transmits the reverse link signal to the wireless access point 10. Furthermore, a configuration of the terminal 12 for receiving data is the reverse of the transmission configuration, and thus, a detailed description of the reception configuration is not provided.

The processor 124 may control operations of various units included in the terminal 12. The processor 124 and/or other units of the terminal 12 may perform or control the process of FIG. 2. The memory 126 may store program codes and data for the terminal 12.

According to the embodiments, by providing differentiation according to the priorities of traffic and providing fairness by the selection of terminals in the contention-based wireless access network, users can fairly use a channel that is a shared resource.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal contending with other terminals to communicate with a wireless access point, the terminal comprising:
a processor for determining a priority of a data frame according to the characteristics of the data frame in communication and splitting an allocated token according to the determined priority,
wherein the token is allocated to the terminal by the wireless access point,
wherein the token is split into a number of pieces, wherein the number is inversely proportional to the determined priority.

2. The terminal of claim 1, wherein the processor determines a degree of token split according to a kind of an application and a network state, on the basis of balance between a transmission probability by contention of terminals and the number of transmissions.

3. The terminal of claim 1, wherein,
a length "$T_{all}$" of the token is a sum of a length "$T_{frame}$" of a token allocated to a data frame to be currently transmitted and a length "$T_{remain}$" of a token allocated to a data frame to be transmitted later, and
in the terminal transmitting a data frame by using a token having the token length "$T_{frame}$", when the token length "$T_{frame}$" is large, a channel contention standby time is shortened, thereby increasing a transmission probability and reducing the number of transmissions.

4. The terminal of claim 1, wherein the processor determines whether to receive a priority selection command from a user according to experience and learning of the user or a current network state that the user actually experiences.

5. The terminal of claim 4, wherein the processor receives a priority selection command from a user through an application or an operating system.

6. The terminal of claim 1, wherein the processor controls an application to determine a priority of a data frame to be used in communication, on the basis of a current network state and quality of service provided to a user.

7. The terminal of claim 1, wherein the processor determines a priority of a data frame to be used in communication according to a kind of an application.

8. The terminal of claim 1, wherein when the terminal contends with other terminals having a similar priority in a wireless access network, the processor enlarges a token split size, thereby increasing a frame transmission probability.

9. The terminal of claim 1, wherein when the terminal does not have an available token or a token length is shorter than a predetermined length, the processor assures a priority to enable transmission of a data frame even without a token.

10. A method of assuring quality of service in consideration of fairness for a terminal contending with other terminals to communicate with a wireless access point, the method comprising:
allocating, by the wireless access point, a token to the terminal;
determining a priority of a data frame according to the characteristics of the data frame in communication and splitting the allocated token according to the determined priority; and
communicating with the wireless access point by using the split token on a channel according to the determined priority,
wherein the allocated token is split into less number of pieces as the determined priority is higher.

11. The method of claim 10, wherein the determining of priority comprises determining a degree of token split according to a kind of an application and a network state, on the basis of balance between a transmission probability by contention of terminals and the number of transmissions.

12. The method of claim 10, wherein,
a length "$T_{all}$" of the token is a sum of a length "$T_{frame}$" of a token allocated to a data frame to be currently transmitted and a length "$T_{remain}$" of a token allocated to a data frame to be transmitted later, and
in the terminal transmitting a data frame by using a token having the token length "$T_{frame}$", when the token length "$T_{frame}$" is large, a channel contention standby time is shortened, thereby increasing a transmission probability and reducing the number of transmissions.

13. The method of claim 10, wherein the determining of the priority comprises enlarging a token split size to thereby increase a frame transmission probability, when the terminal contends with other terminals having similar priority in a wireless access network.

14. The method of claim 10, wherein the determining of the priority comprises assuring a priority to enable transmission of a data frame even without a token, when the terminal does not have an available token or a token length is shorter than a predetermined length.

* * * * *